US011911641B2

(12) United States Patent
Boussmiaa El Bourakadi

(10) Patent No.: US 11,911,641 B2
(45) Date of Patent: Feb. 27, 2024

(54) FIRE SPREAD-LIMITING ASSEMBLY AND FIRE SPREAD-LIMITING METHOD

(71) Applicant: GREEN STAR SYSTEM INC., Montréal (CA)

(72) Inventor: Mohammed Boussmiaa El Bourakadi, Montréal (CA)

(73) Assignee: GREEN STAR SYSTEM INC., Montréal (CA)

( * ) Notice: Subject to any disclaimer, the term of this patent is extended or adjusted under 35 U.S.C. 154(b) by 406 days.

(21) Appl. No.: 17/158,329

(22) Filed: Jan. 26, 2021

(65) Prior Publication Data

US 2021/0290996 A1 Sep. 23, 2021

Related U.S. Application Data

(60) Provisional application No. 62/991,375, filed on Mar. 18, 2020.

(51) Int. Cl.
*A62C 2/24* (2006.01)
*A62C 3/02* (2006.01)

(52) U.S. Cl.
CPC .............. *A62C 3/0257* (2013.01); *A62C 2/24* (2013.01); *A62C 3/0214* (2013.01)

(58) Field of Classification Search
CPC ........... A62C 3/0257; A62C 2/06; A62C 2/10; A62C 2/24; A62C 8/06
USPC ............................................................ 169/48
See application file for complete search history.

(56) References Cited

U.S. PATENT DOCUMENTS 4,433,733 A * 2/1984 Cunningham .......... E21B 35/00 169/69
4,994,317 A * 2/1991 Dugan ................. D06N 3/0063 442/72
5,860,251 A 1/1999 Gleich
5,885,912 A 3/1999 Bumbarger
6,125,941 A 10/2000 Lokken
6,174,588 B1 1/2001 Nordvik
6,192,633 B1 2/2001 Hilbert
6,521,362 B2 * 2/2003 Koeppen ................... B32B 1/08 428/921
6,708,451 B1 3/2004 Gomes
7,866,101 B2 1/2011 Boggs, Jr.
8,146,298 B2 4/2012 Bush et al.
8,925,252 B2 1/2015 Meager et al.
8,997,884 B1 4/2015 Morlier
9,381,387 B2 7/2016 Douglas
9,598,860 B2 3/2017 Davis et al.
(Continued)

FOREIGN PATENT DOCUMENTS

CN 207535441 U 6/2018
FR WO02072203 * 9/2002 ............... A62C 2/10
WO 97/44094 A1 11/1997

*Primary Examiner* — Christopher R Dandridge
(74) *Attorney, Agent, or Firm* — FLYNN THIEL, P.C.

(57) ABSTRACT

The present disclosure concerns a fire spread-limiting assembly comprising a heat resistant covering; and a cooling fluid circulation assembly comprising: a cooling fluid source integrated to the heat resistant covering, one or more flexible fluid lines being part of the heat resistant covering, and a pump fluidly connected to said one or more flexible fluid lines and to the cooling fluid source and configured to circulate the cooling fluid within said one or more flexible fluid lines upon actuation. There is also disclosed a method for limiting a spread of a fire.

18 Claims, 5 Drawing Sheets

(56) References Cited

U.S. PATENT DOCUMENTS

| | | | | |
|---|---|---|---|---|
| 2011/0067891 | A1* | 3/2011 | Linares | A62C 3/0257 169/48 |
| 2015/0068776 | A1* | 3/2015 | Douglas | A62C 3/0214 169/48 |
| 2019/0060684 | A1* | 2/2019 | West | A62C 2/10 |
| 2019/0175964 | A1* | 6/2019 | Beecham | A62C 2/06 |

* cited by examiner

FIRE SPREAD-LIMITING ASSEMBLY AND FIRE SPREAD-LIMITING METHOD

PRIOR APPLICATION

The present application claims priority from U.S. provisional patent application No. 62/991,375, filed on Mar. 18, 2020, and entitled "FIRE SPREAD-LIMITING ASSEMBLY AND FIRE SPREAD-LIMITING METHOD", the disclosure of which being hereby incorporated by reference in its entirety.

TECHNICAL FIELD

The technical field relates to fire protection assemblies, and more particularly to fire spread-limiting assemblies and to methods for limiting fire spread.

BACKGROUND

Firefighting is a battle against time: when a fire occurs, for instance and without being limitative in a building, in a vehicle or outside thereof, it is essential to quickly intervene so as to limit the damages as well as to limit fire from spreading around the initial fire. However, particularly when the fire occurs in remote locations, it might require some time for firemen to reach the fire. Moreover, existing firefighting devices that can be available for instance in a building or in a vehicle are not always easy to use and/or efficient.

In view of the above, there is a need for a fire spread-limiting assembly which would be able to overcome or at least minimize some of the above-discussed prior art concerns and would be able to quickly and efficiently limit the spreading of a fire and inhibit the formation of flame upon a structure or a location when exposed to the imminent threat of fire.

BRIEF SUMMARY

It is therefore an aim of the present invention to address the above-mentioned issues.

According to a general aspect, there is provided a fire spread-limiting assembly comprising a heat resistant covering; and a cooling fluid circulation assembly comprising a cooling fluid source integrated to the heat resistant covering, one or more flexible fluid lines being part of the heat resistant covering, and a pump fluidly connected to the one or more flexible fluid lines and to the cooling fluid source and configured to circulate the cooling fluid within the one or more flexible fluid lines upon actuation.

According to an aspect, the heat resistant covering comprises first and second heat resistant layers, the one or more flexible fluid lines extending at least partially between the first and second heat resistant layers.

According to another aspect, the one or more flexible fluid lines are secured to at least one of the first and second heat resistant layers.

According to another aspect, at least one of the first and second heat resistant layers is at least partially made of fiber glass.

According to another aspect, the cooling fluid source is at least partially delimited by one of the first and second heat resistant layers.

According to another aspect, the cooling fluid source is at least partially formed by folding an edge of said one of the first and second heat resistant layers.

According to another aspect, the heat resistant covering further comprises an absorbing material layer arranged between the first and second heat resistant layers, said absorbing material layer surrounding at least partially said one or more flexible fluid lines.

According to another aspect, the heat resistant covering further comprises first and second water resistant layers, the absorbing material layer being arranged between said first and second water resistant layers.

According to another aspect, one or more perforations are formed in the one or more flexible lines for the cooling fluid to flow into the absorbing material layer.

According to another aspect, the cooling fluid source is fluidly connected to the absorbing material layer.

According to another aspect, the heat resistant covering comprises a lower end portion and the cooling fluid source is mounted to the lower end portion of the heat resistant covering.

According to another aspect, the heat resistant covering is configurable in an extended configuration and in a compact configuration, the fire spread-limiting assembly further comprising a deployment device to configure the heat resistant covering from the compact configuration into the extended configuration.

According to another aspect, the deployment device comprises one or more extendable support members of the scissor type or of the parallelogram type.

According to another aspect, the fire spread-limiting assembly comprises a deployment controller configured to monitor a fire condition and to actuate the deployment device when the monitored fire condition corresponds to a pre-determined fire condition.

According to another aspect, the fire spread-limiting assembly comprises a mobile structure supporting the heat resistant covering and configured to displace the fire spread-limiting assembly.

According to another aspect, the cooling fluid circulation assembly further comprises a fluid-cooling device fluidly connected to the cooling fluid source and configured to maintain a temperature of the cooling fluid below a pre-determined temperature limit.

According to another aspect, the fire spread-limiting assembly comprises a complementary cooling fluid tank fluidly connected to the cooling fluid circulation assembly in a selective manner.

According to another aspect, the fire spread-limiting assembly comprises a cooling fluid controller configured to monitor a heating condition of the fire spread-limiting assembly and to fluidly connect the complementary cooling fluid tank to the cooling fluid circulation assembly when the monitored heating condition corresponds to a pre-determined heating condition.

According to another aspect, the fire spread-limiting assembly comprises a pump controller configured to monitor a fire condition and to actuate the pump of the cooling fluid circulation assembly when the monitored fire condition corresponds to a pre-determined fire condition.

According to another aspect, the pump controller is further configured to monitor a heating condition of the fire spread-limiting assembly and to modify a flow rate of the pump when the monitored heating condition corresponds to a pre-determined heating condition.

According to another aspect, the heat resistant covering comprises upper and lower edge portions and first and second lateral portions extending between the upper and lower edge portions, said one or more flexible lines comprising a main distribution line extending substantially between the upper and lower edge portions and one or more secondary distribution lines fluidly connected to the main distribution line.

According to another aspect, the one or more secondary distribution lines extend substantially between the first and second lateral portions.

According to another aspect, the secondary distribution lines are substantially parallel to each other.

According to another general aspect, there is provided a method for limiting a spread of a fire, comprising covering or confining at least partially the fire with a heat resistant covering of a fire spread-limiting assembly; actuating a pump of the fire spread-limiting assembly fluidly connected to a cooling fluid source of a cooling fluid circulation assembly integrated to the heat resistant covering and to one or more flexible fluid lines being part of the heat resistant covering for the cooling fluid to circulate within said one or more flexible fluid lines.

According to another aspect, the method further comprises flowing the cooling fluid into an absorbing material layer of the heat resistant covering.

According to another aspect, the method further comprises providing the heat resistant covering in a compact configuration; monitoring a fire condition; and configuring the heat resistant covering in an extended configuration when the monitored fire condition corresponds to a pre-determined fire condition.

According to another aspect, the method further comprises monitoring a heating condition of the fire spread-limiting assembly; and fluidly connecting a complementary cooling fluid tank to the cooling fluid circulation assembly when the monitored heating condition corresponds to a pre-determined heating condition.

According to another aspect, the method further comprises monitoring a fire condition; and actuating the pump when the monitored fire condition corresponds to a pre-determined fire condition.

According to another aspect, the method further comprises monitoring a heating condition of the fire spread-limiting assembly; and modifying a flow rate of the pump when the monitored heating condition corresponds to a pre-determined heating condition.

Other possible aspect(s), object(s), embodiment(s), variant(s) and/or advantage(s) of the present invention, all being preferred and/or optional, are briefly summarized hereinbelow.

DETAILED DESCRIPTION

Figure 1:
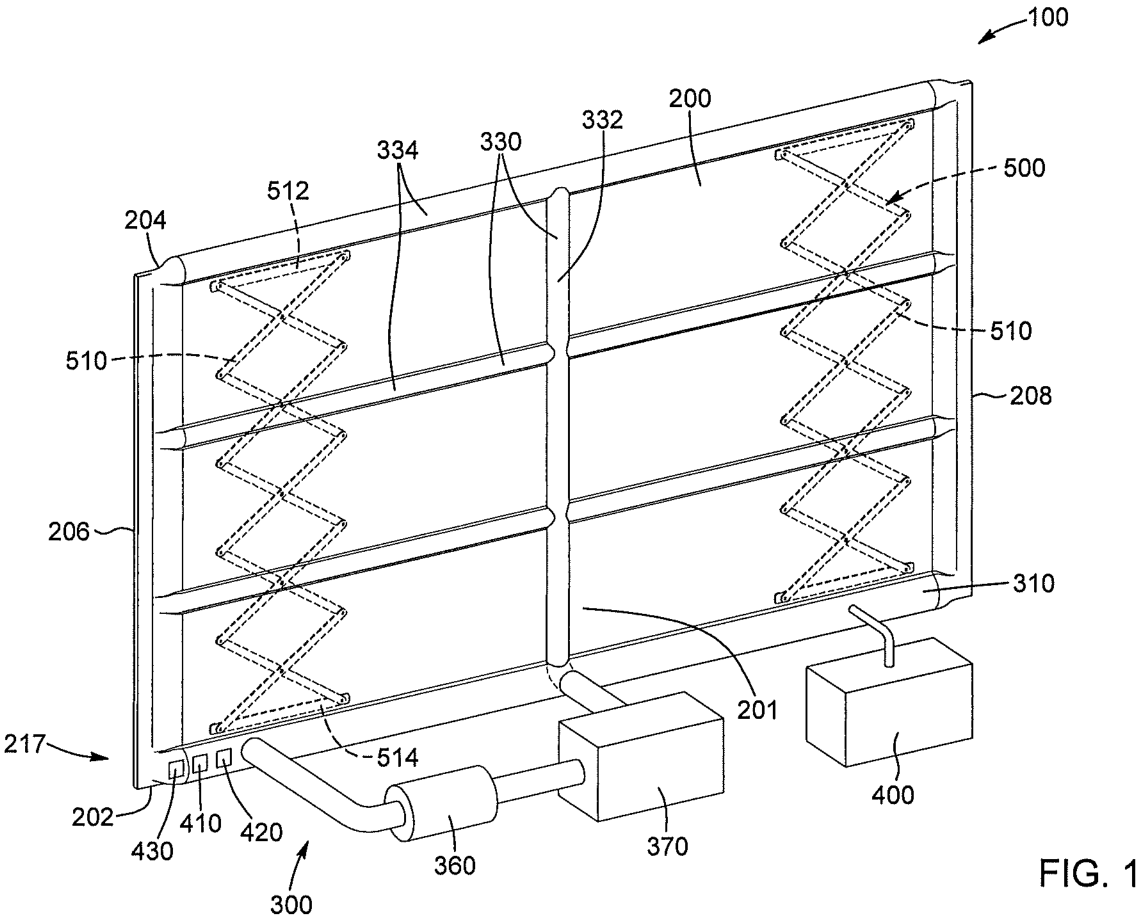
FIG. 1 is a front perspective view of a fire spread-limiting assembly in accordance with an embodiment, the fire spread-limiting assembly having a heat resistant covering configured in an extended configuration.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as “above”, “below”, “forward”, “rearward”, “left”, “right” and the like should, unless otherwise indicated, be taken in the context of the figures only and should not be considered limiting. Moreover, the figures are meant to be illustrative of certain characteristics of the fire spread-limiting assembly and are not necessarily to scale.

To provide a more concise description, some of the quantitative expressions given herein may be qualified with the term “about”. It is understood that whether the term “about” is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of “one embodiment”, “an embodiment” or “some embodiments” do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to “some embodiments”, “an embodiment”, “one embodiment” or “other embodiments” means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms “including”, “comprising”, and grammatical variants thereof do not preclude the addition of one or more components, features, steps, or integers or groups thereof and that the terms are to be construed as specifying components, features, steps or integers. If the specification or claims refer to “an additional” element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Fire-Spread Limiting Assembly

Figure 2:
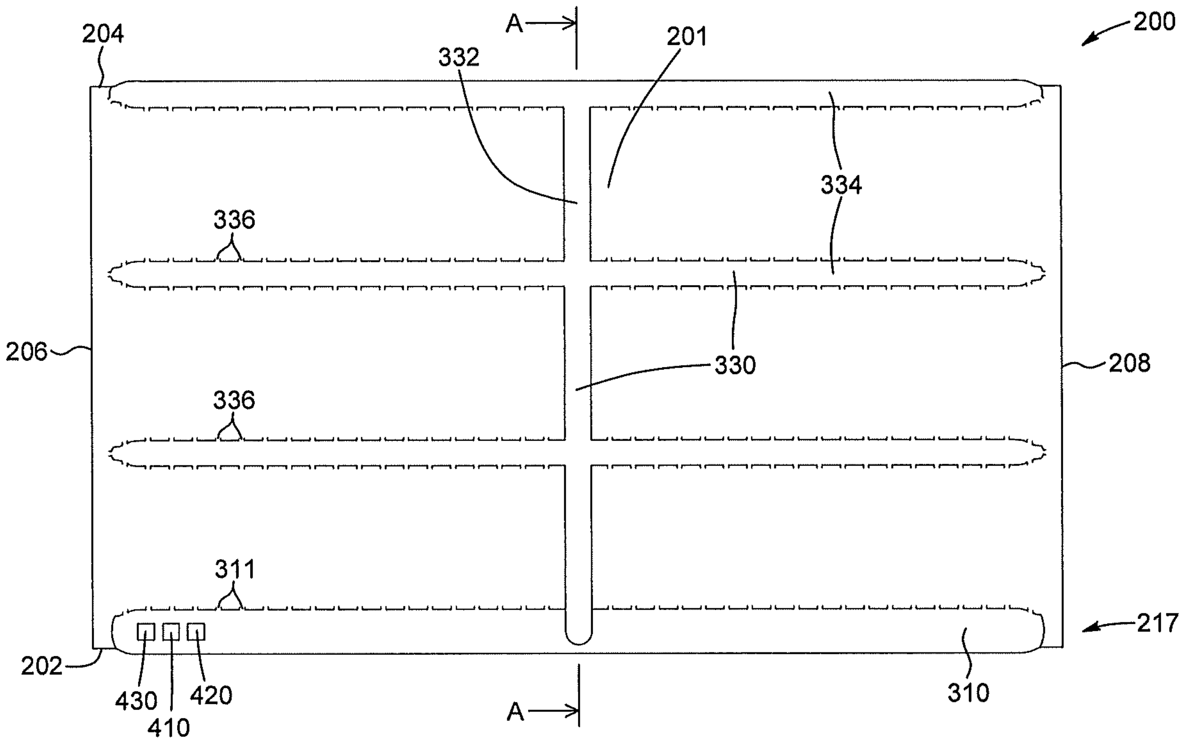
FIG. 2 is a front elevation view of the heat resistant covering of the fire spread-limiting assembly of FIG. 1.

Referring now to the drawings, and more particularly to FIGS. 1 and 2, there is shown a fire spread-limiting assembly 100 comprising a heat resistant covering 200 and a cooling fluid circulation assembly 300. In the embodiment shown, the cooling fluid circulation assembly 300 comprises a cooling fluid source 310 integrated to the heat resistant covering 200, one or more flexible fluid lines 330 that are part of the heat resistant covering, and a pump 360 fluidly connected to the one or more flexible fluid lines 330 and to the cooling fluid source 310. The pump 360 is configured to circulate the cooling fluid of the cooling fluid source 310 within the one or more flexible fluid lines 330 upon actuation of the pump 360.

As detailed below, the fire spread-limiting assembly 100 is configured to limit fire spread thanks to the cooling fluid circulating within the one or more flexible fluid lines 330.

In the embodiment shown, the cooling fluid designates a substance, typically liquid or gas, that is used to reduce or regulate the temperature of the fire spread-limiting assembly 100. For instance, the cooling fluid has high thermal capacity, low viscosity, is chemically inert and/or neither causes nor promotes corrosion of the cooling fluid circulation assembly 300. For instance, the cooling fluid comprises water, polyalkylene glycol or any other fluid having coolant materials.

Heat Resistant Covering

In the embodiment shown, as represented for instance in FIGS. 1 and 2, the heat resistant covering 200 has a substantially rectangular shape. The heat resistant covering 200 comprises a lower edge portion 202 and an opposed upper edge portion 204. In the embodiment shown, the lower and upper edge portions 202, 204 extend substantially parallel to each other when the heat resistant covering 200 is configured in an extended configuration, as represented in FIG. 2. The heat resistant covering 200 further comprises first and second opposed lateral portions 206, 208 extending between the lower and upper edge portions 202, 204. In the embodiment shown, the first and second opposed lateral portions 206, 208 extend substantially parallel to each other when the heat resistant covering 200 is configured in the extended configuration.

Figure 5:
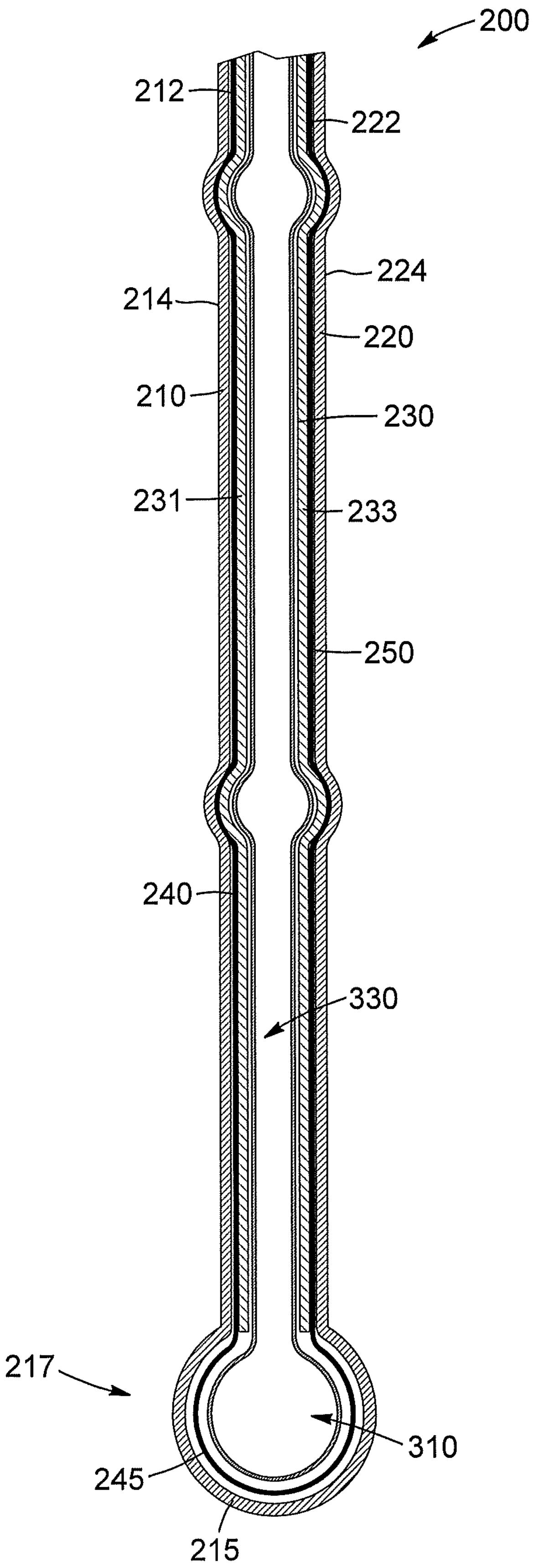
FIG. 5 is a cross-sectional view of a lower section of the heat resistant covering of FIG. 2, taken along cross-section lines A-A of FIG. 2.

In the embodiment shown, as represented in FIG. 5, the heat resistant covering 200 comprises first and second heat resistant layers 210, 220 (or inner and outer heat resistant layers 210, 220, considered with respect to the object, building, person, . . . substantially covered by the heat resistant covering 200, when configured in the extended configuration).

For instance, at least one of the first and second heat resistant layers 210, 220 is at least partially made of a material having mechanical and/or heat-resisting properties. For instance, at least one of the first and second heat resistant layers 210, 220 is at least partially made of fiberglass, Kevlar™, carbon fiber or a combination thereof. The first and second heat resistant layers 210, 220 might have a substantially similar structure and/or composition or could be made of different materials.

The first and second heat resistant layers 210, 220 each comprise an inner face 212, 222, and an opposed outer face 214, 224. The inner faces 212, 222 of the first and second heat resistant layers 210, 220 at least partially face each other.

In the embodiment shown, and as represented in FIG. 5, the flexible fluid lines 330 extend at least partially between the first and second heat resistant layers 210, 220 of the heat resistant covering 200. For instance, the flexible fluid lines 330 are secured to at least one of the first and second heat resistant layers 210, 220. In the embodiment shown, the flexible fluid lines 330 are secured to the inner faces 212, 222 of the first and second heat resistant layers 210, 220. The flexible fluid lines 330 can be glued, welded, sewn, riveted or secured by any other suitable mechanical fasteners to the first and second resistant layers 210, 220. It should be understood that the flexible fluid lines 330 are not necessarily directly secured to the first and second heat resistant layers 210, 220.

In the embodiment shown, the cooling fluid source 310 is at least partially delimited by at least one of the first and second heat resistant layers 210, 220 of the heat resistant covering 200. In the embodiment shown, the first and second heat resistant layers 210, 220 are joined to each other at a lower portion thereof. For instance, the first and second heat resistant layers 210, 220 are made of a single layer 215 folded along a central portion thereof forming a lower portion 217 of the heat resistance covering 200. The term "lower portion" equally refers to the first and second heat resistant layers 210, 220, to the heat resistant covering 200, or to any other component of the heat resistant covering 200. It could also be conceived a heat resistant covering that would be made of two distinct first and second heat resistant layers that would be secured to each other (for instance glued, welded or sewn to each other).

In the embodiment shown, the cooling fluid source 310 is at least partially formed by folding the single layer 215 forming the first and second heat resistant layers 210, 220. For instance, the cooling fluid source 310 could be at least partially formed or delimited by folding at least one of the first and second heat resistant layers 210, 220. In the embodiment shown, the cooling fluid source 310 is at least partially delimited or formed by the inner faces 212, 222 of the first and second heat resistant layers 210, 220. It could also be conceived a fire spread-limiting assembly 100 in which the cooling fluid source 310 would only be limited by the inner face 212, 222 of a single one of the first and second heat resistant layers 210, 220, the single one of the first and second heat resistant layers 210, 220 being folded on itself.

In the embodiment shown, as represented in FIG. 5, the heat resistant covering 200 further comprises an absorbing material layer 230 arranged between the first and second heat resistant layers 210, 220, more particularly between the inner faces 212, 222 of the first and second heat resistant layers 210, 220. The absorbing material layer 230 is arranged so as to surround (or sheath or cover) at least partially the flexible fluid lines 330. More particularly, in the embodiment shown, the absorbing material layer 230 comprises first and second absorbing material layers 231, 233 arranged between at least a portion of the flexible fluid lines 330 and respectively the first and second heat resistant layers 210, 220 (the inner faces 212, 222 thereof, in the embodiment shown).

For instance, the first and second absorbing material layers 231, 233 are at least partially made of foam, fabrics or any other material having fluid-absorbing properties and/or heat-resisting properties.

In the embodiment shown, the heat resistant covering 200 further comprises first and second water resistant layers 240, 250 (or inner and outer water resistant layers 240, 250, considered with respect to the object, building, person, . . . substantially covered by the heat resistant covering 200, when configured in the extended configuration). The absorbing material layer 230 is arranged between the first and second water resistant layers 240, 250 (for instance between inner faces thereof).

In the embodiment shown, the first and second water resistant layers 240, 250 are made of a single water resistant layer 245 folded along a central portion thereof forming the lower portion of the first and second water resistant layers 240, 250. It could also be conceived a heat resistant covering that would be made of two distinct first and second water resistant layers. The two distinct first and second water resistant layers could be secured to each other (for instance glued, welded or sewn to each other) at a lower portion thereof.

In the embodiment shown, the cooling fluid source 310 is thus at least partially delimited (or formed) by the first and second water resistant layers 240, 250 of the heat resistant covering 200.

For instance, at least one of the first and second water resistant layers 240, 250 is at least partially made of fiberglass, Kevlar™, carbon fiber or a combination thereof. The first and second water resistant layers 240, 250 might have a substantially similar structure and/or composition or could be made of different materials.

In the embodiment shown, the first water resistant layer 240 and the first heat resistant layer 210 are made of distinct layers superposed to each other (for instance at least partially secured to each other, for instance by being glued, welded, sewn, . . . to each other). It could also be conceived a heat resistant covering in which the first water resistant layer and the first heat resistant layer would be made of a single layer having mechanical and/or heat-resisting properties and fluid-absorbing properties. The same considerations apply to the second water resistant layer 250 and the second heat resistant layer 220.

As mentioned above, and as represented in FIGS. 1 and 6, the heat resistant covering 200 is configurable in the extended configuration. The heat resistant covering 200 is also configurable in a compact configuration, for transport and/or storage purposes, when the fire spread-limiting assembly 100 is not in use. The heat resistant covering 200, the flexible fluid lines 330 and the cooling fluid source 310 are at least partially made in a material having flexibility properties so as not to prevent the heat resistant covering 200 from being configurable from one of the extended and compact configurations to the one.

It is thus understood that, in the embodiment shown, the flexible fluid lines 330 are secured to the first and second heat resistant layers 210, 220 via the absorbing material layers 231, 233 and the first and second water resistant layers 240, 250.

It is appreciated that the shape, and the configuration of the heat resistant covering, for instance, the shape, the number, the configuration, the structure of the first and second heat resistant layers, the first and second water resistant layers and the first and second absorbing material layers can vary from the embodiment shown.

Cooling Fluid Circulation Assembly

Cooling Fluid Source

As mentioned above, the cooling fluid source 310 is integrated to the heat resistant covering 200, to the lower end portion 217 thereof, in the embodiment shown. The term "integrated" should be understood as meaning that the cooling fluid source 310 is united with the heat resistant covering 200 (i.e. the cooling fluid source 310 is not spaced apart from—or at a distance of—the heat resistant covering 200). In the embodiment shown, the cooling fluid source 310 is mounted to the lower end portion 217 of the heat resistant covering 200.

The cooling fluid source 310 is further fluidly connected to the flexible fluid lines 330 and to the absorbing material layer 230.

It is appreciated that the shape, the configuration, and the location of the cooling fluid source 310 can vary from the embodiment shown.

Flexible Fluid Lines

In the embodiment shown, the flexible fluid lines 330 comprise a main distribution line 332 extending substantially between the upper and lower edge portions 204, 202 of the heat resistant covering 200, for instance substantially parallel to the first and second lateral portions 206, 208 when the heat resistant covering 200 is configured in the extended configuration. In the embodiment shown, the main distribution line 332 extend substantially in a central portion 201 of the heat resistant covering 200.

The flexible fluid lines 330 further comprise a plurality of secondary distribution lines 334 (three, in the embodiment represented in FIGS. 1 and 2) fluidly connected to the main distribution line 332. In the embodiment shown, the secondary distribution lines 334 extend between the first and second lateral portions 206, 208 of the heat resistant covering 200, for instance substantially parallel to the upper and lower edge portions 202, 204 when the heat resistant covering 200 is in the extended configuration. In the embodiment shown, the secondary distribution lines 334 are substantially parallel to each other and substantially perpendicular to the main distribution line 332. Moreover, the secondary distribution lines 334 extend on both sides of the heat resistant covering 200 formed on each side of the main distribution line 332, when the main distribution line 332 extend in the central portion 201 of the heat resistant covering 200.

In the embodiment shown, as represented in FIG. 2, the main and secondary distribution lines 332, 334 of the flexible fluid lines 330 are a substantially similar cross-section. It could also be conceived main and secondary distribution lines having different cross-sections (for instance a main distribution line having a cross-section greater than a cross-section of at least one of the secondary distribution lines).

As represented in FIG. 2, perforations 336 are formed in at least some of the flexible fluid lines 330 (in at least some of the secondary distribution lines 334 in the embodiment shown). The perforations 336 are configured so that the cooling fluid circulating into the flexible fluid lines 330 can flow into the absorbing material layer 230 surrounding the flexible fluid lines 330.

The present disclosure is not limited to flexible fluid lines 330 having perforations formed therein. It could also be conceived a fire spread-limiting assembly having flexible fluid lines with at least some areas made of a permeable or porous material, for the cooling fluid circulating into the flexible fluid lines to escape therefrom so as to circulate into the absorbing material layer surrounding the flexible fluid lines.

Moreover, the cooling fluid source 310 is in fluid communication with the absorbing material layer 230 of the heat resistant covering 200 for the cooling fluid circulating into the absorbing material layer 230 to be at least partially collected into the cooling fluid source 310 under the force of gravity and/or upon actuation of the pump 360. To this end, perforations 311 can be formed in the cooling fluid source 310, as represented in FIG. 1, for instance in an upper portion thereof. It could also be conceived a cooling fluid source with at least some areas made of a permeable or porous material, for the cooling fluid circulating into the absorbing material layer surrounding the flexible fluid lines to be collected at least partially into the cooling fluid source, under the force of gravity and/or upon actuation of the pump. It is thus understood that the cooling fluid source 310, the flexible fluid lines 330 and the absorbing material layer 230 form a substantially closed cooling fluid circuit.

It is appreciated that the shape, the configuration, and the location of the flexible fluid lines 330, for instance the shape, the configuration, the location and the number of the main and secondary distribution lines 332, 334 can vary from the embodiment shown.

Additional Features of the Cooling Fluid Circulation Assembly

As represented in FIG. 1, in the embodiment shown, the cooling fluid circulation assembly 300 further comprises a fluid-cooling device 370 fluidly connected to the cooling fluid source 310. It is thus understood that in the embodiment shown, a cooling fluid circuit is defined by the flexible fluid lines 330, the cooling fluid source 310, the pump 330 and the fluid-cooling device 370. In the embodiment shown, the pump 360 and the fluid-cooling device 370 are spaced apart from the heat resistant covering 200 (i.e. the pump 360 and the fluid cooling device 370 are not integrated to the heat resistant covering 200). This arrangement allows, for instance, the repair and/or the replacement of the pump 360 and/or the fluid-cooling device 370 without requiring the repair and/or replacement of the heat resistant covering 200. It could however also be conceived a fire spread-limiting assembly in which the pump and/or the fluid-cooling device would be integrated to the heat resistant covering.

The fluid-cooling device 370 is configured to maintain a temperature of the circulating cooling fluid below a pre-determined temperature limit. The fluid-cooling device 370 could be permanently fluidly connected to the cooling fluid source 310, or selectively connected to the cooling fluid source 310, for instance only when a temperature of the cooling fluid circulating in the cooling fluid circulation assembly 300 is equal to or greater than a pre-determined threshold.

In the embodiment shown, as represented in FIG. 1, the fire spread-limiting assembly 100 further comprises a complementary cooling fluid tank 400 fluidly connected to the cooling fluid circulation assembly 300 in a selective manner. In the embodiment shown, the complementary cooling fluid tank 400 is selectively fluidly connected to the cooling fluid source 310 integrated to the heat resistant covering 200. In the embodiment shown, the complementary cooling fluid tank 400 is spaced-apart from the heat resistant covering 200. As detailed below, the complementary cooling fluid tank 400 is configured to provide additional cooling fluid to the cooling fluid source 310, in case of a substantial vaporization of the cooling fluid circulating in the cooling fluid circulation assembly 300.

In the embodiment shown, the fire spread-limiting assembly 100 further comprises a cooling fluid controller 410 configured to monitor a heating condition of the fire spread-limiting assembly 100. For instance, the cooling fluid controller 410 is configured to monitor the temperature of the circulating cooling fluid (for instance the temperature of the cooling fluid circulating in the cooling fluid source 310).

The cooling fluid controller 410 is further configured to fluidly connect the complementary cooling fluid tank 400 to the cooling fluid circulation assembly 300 when the monitored heating condition corresponds to a pre-determined heating condition. For instance, the cooling fluid controller 410 is configured to fluidly connect the complementary cooling fluid tank 400 to the cooling fluid circulation assembly 300 when the temperature of the cooling fluid reaches a pre-determined temperature. The cooling fluid controller 410 is thus operatively coupled to the cooling fluid circulation assembly 300 (for instance to the cooling fluid source 310 thereof) and to the complementary cooling fluid tank 400.

In the embodiment shown, the fire spread-limiting assembly 100 further comprises a pump controller 420 configured to monitor a fire condition and to actuate the pump 360—or to adjust an actuation parameter of the pump 360—of the cooling fluid circulation assembly 300 when the monitored fire condition corresponds to a pre-determined fire condition. For instance, the pump controller 420 is configured to monitor a temperature in the vicinity of the heat resistant covering 200 or an atmosphere composition in the vicinity of the heat resistant covering 200 and to actuate the pump 360 when the temperature reaches a pre-determined fire temperature and/or when the atmosphere composition corresponds to a pre-determined fire atmosphere composition.

For instance, the pump controller 420 is configured to monitor a heating condition of the fire spread-limiting assembly 100 (for instance to monitor a temperature in the vicinity of the fire spread-limiting assembly 100) and to modify a flow rate of the pump 360 when the monitored heating condition corresponds to a pre-determined heating condition. In other words, the pump controller 420 is configured to adjust the flow rate of the circulating cooling fluid upon monitoring of the heating condition of the fire spread-limiting assembly 100. The pump controller 420 is thus operatively coupled to the cooling fluid circulation assembly 300 (for instance to the pump 360 thereof).

It is appreciated that the shape, the configuration, and the location of the complementary cooling fluid tank, the cooling fluid controller and the pump controller can vary from the embodiment shown.

Additional Features of the Fire Spread Limiting Assembly

As represented in FIG. 1, the fire spread-limiting assembly 100 further comprises a deployment device 500 to configure the heat resistant covering 200 from one of the compact and extended configurations into the other one of the compact and the extended configurations. It is also understood that the heat resistant covering 200 can be configured in a plurality of intermediate configurations between the compact configuration and the extended configuration. It could also be conceived a fire spread-limiting assembly that would be manually configurable into one of the compact, extended and intermediate configurations.

In the embodiment shown, the deployment device 500 comprises a plurality of extendable support members 510 (two, in the embodiment shown) mounted to the heat resistant covering 200 (for instance to the outer face 214, 224 of one of the first and second heat resistant layers 210, 220 or between the inner faces 212, 222 of the first and second heat resistant layers 210, 220). In the embodiment shown, each of the extendable support members 510 comprises an upper end portion 512 mounted to the upper edge portion 204 (or in the vicinity thereof) of the heat resistant covering 200, and an opposed lower end portion 514 mounted to the lower edge portion 202 (or in the vicinity thereof) of the heat resistant covering 200. In the embodiment shown, the extendable support members 510 extend along a substantially vertical direction.

In the embodiment shown, the extendable support members 510 are of the parallelogram type. It could also be conceived extendable support members of the scissor type or any other mechanical structure (such as, for instance, a shutter) mountable to the heat resistant covering 200 to configure the heat resistant covering 200 from one of the compact, extended and intermediate configurations into another one of the compact, the extended and the intermediate configurations.

The fire spread-limiting assembly 100 further comprises a deployment controller 430 configured to monitor a fire condition and to actuate the deployment device 500 when the monitored fire condition corresponds to a pre-determined fire condition. Similarly to the above-disclosed cooling fluid controller 410 and pump controller 420, the deployment controller 420 can be configured to monitor a temperature in the vicinity of the heat resistant covering 200 or an atmosphere composition in the vicinity of the heat resistant covering 200 and to actuate the deployment device 500 when the temperature reaches a pre-determined fire temperature and/or when the atmosphere composition corresponds to a pre-determined fire atmosphere composition. The deployment controller 430 is thus operatively coupled to the deployment device 500.

It is appreciated that the shape, the configuration, the structure and the location of the deployment device 500, for example the shape, the configuration, the number, the structure and the location of the extendable support members 510, can vary from the embodiment shown.

Figure 3:
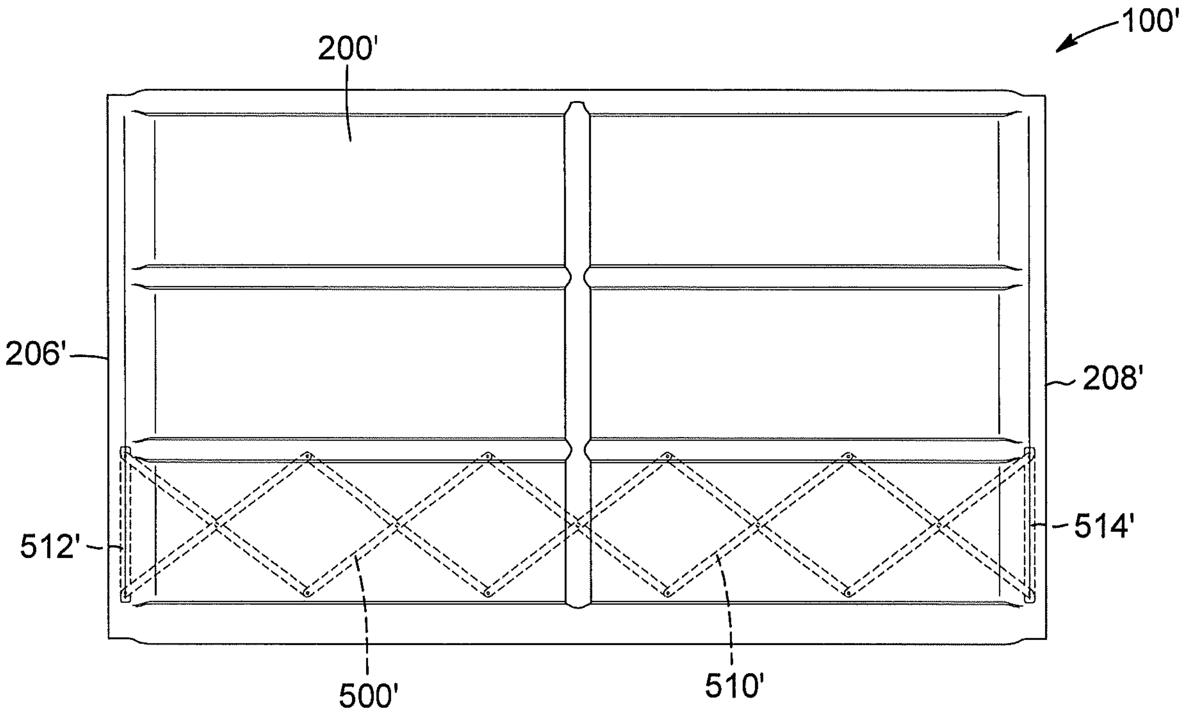
FIG. 3 is a front elevation view of a fire spread-limiting assembly in accordance with another embodiment, the heat resistant covering being configured in the extended configuration.
Figure 4:
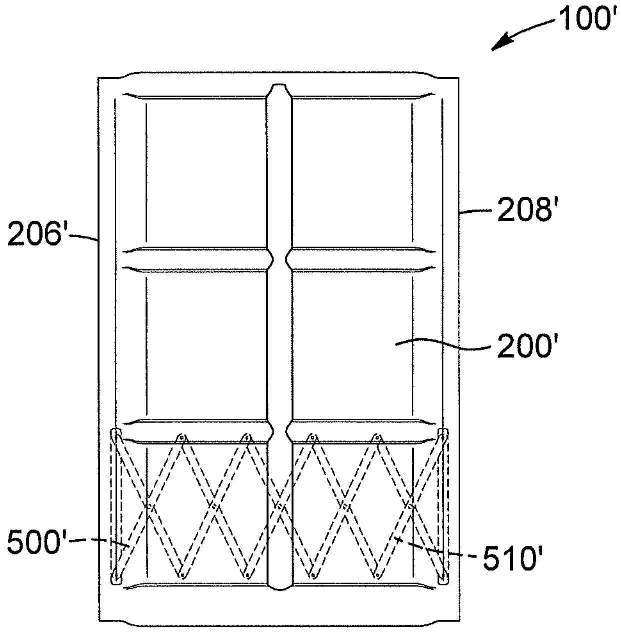
FIG. 4 is a front elevation view of the fire spread-limiting assembly of FIG. 3, the heat resistant covering being configured in a partially compact configuration.

For instance, as represented in FIGS. 3 and 4, the extendable support member 510' of the deployment device 500' could comprise first and second lateral end portions 512', 514' mounted respectively to the first and second lateral portions 206', 208' of the heat resistant covering 200' (or in the vicinity thereof). The deployment device 500' of the fire spread-limiting assembly 100' could thus extend along a substantially horizontal direction to configure the heat resistant covering 200' from one of the compact and extended (FIG. 3) configurations into the other one of the compact and the extended configurations, or into any intermediate configuration therebetween, like in a partially compact configuration (FIG. 4).

The fire spread-limiting assembly can further comprise a mobile structure (not represented) supporting the heat resistant covering 200 and comprising for instance wheels or any other displacement devices. The mobile structure is thus configured to displace the fire spread-limiting assembly 100 (for instance to store it when not in use or to approach it from the fire for the heat resistance covering 200 to be configured in the extended configuration).

It is appreciated that the shape, the configuration, and the structure of the fire spread-limiting assembly 100 can vary from the embodiment shown. For instance, the shape, the configuration, and the dimensions of the heat resistant covering can be adjusted as a function of the location where the fire spread-limiting assembly is intended to be used and/or of the shape and dimensions of the building or object the heat resistant covering is configured to at least partially cover.

Figure 6:
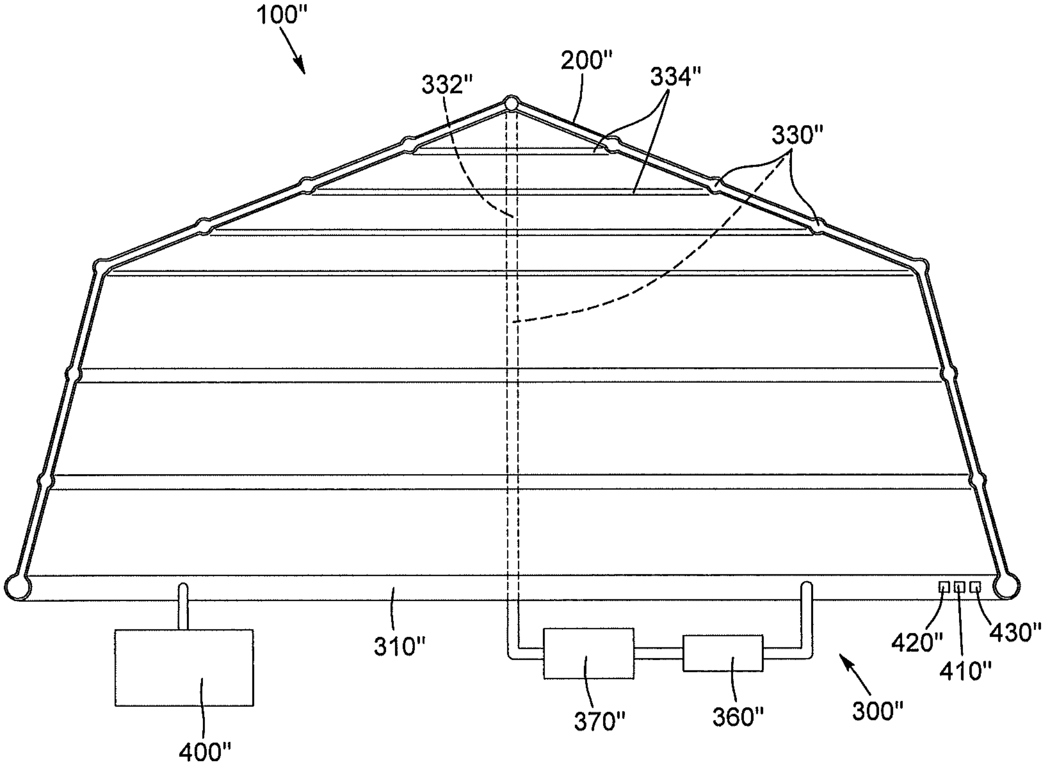
FIG. 6 is a cross-sectional view of a fire spread-limiting assembly in accordance with another embodiment, the heat-resistant covering being configured in the extended configuration and extending over a building.

FIG. 6 represents another embodiment of the fire spread-limiting assembly 100" configured to be deployed over at least a portion of a building (not represented). Similarly to the above-described embodiment, the fire spread-limiting assembly 100" comprises a heat resistant covering 200" shaped and dimensioned to at least partially cover, when in the extended configuration, the building. The fire spread-limiting assembly 100" further comprises a cooling fluid circulation assembly 300" comprising a cooling fluid source 310", flexible fluid lines 330", a pump 360" and a fluid-cooling device 370". The fire spread-limiting assembly 100" also comprises a complementary cooling fluid tank 400", a cooling fluid controller 410", a pump controller 420" and a deployment controller 430". As detailed above with reference to the first embodiment, the complementary cooling fluid tank 400" is selectively fluidly couplable to the cooling fluid source 310" and is thus configured to provide additional cooling fluid to the cooling fluid source 310", in case of a substantial vaporization of the cooling fluid circulating in the cooling fluid circulation assembly 300". In the embodiment shown, when configured in the extended configuration, the heat resistant covering 200" has a substantially big top shape. The flexible fluid lines 330" comprises a main distribution line 332" and a plurality of secondary distribution lines 334" (seven, in the embodiment shown), fluidly connected to the main distribution line 332".

Method for Limiting Fire Spread of a Fire

The present disclosure also concerns a method for limiting a spread of a fire. The method according to embodiments of the present disclosure may be carried out with a fire spread-limiting assembly such as those described above.

The method comprises covering and/or confining at least partially the fire with a heat resistant covering 200 of a fire spread-limiting assembly 100 and actuating a pump 360 of a cooling fluid circulation assembly 300 of the fire spread-limiting assembly 100 fluidly connected to a cooling fluid source 310 of the cooling fluid circulation assembly 300. The cooling fluid source 310 is integrated to the heat resistant covering 200 and to one or more flexible fluid lines 330 being part of the heat resistant covering 200 for the cooling fluid to circulate within the one or more flexible fluid lines 330.

It is thus understood that the pump 360 drives the cooling fluid from the cooling fluid source 310 to the one or more flexible fluid lines 330 (i.e. the pump 360 circulates the cooling fluid contained in the cooling fluid source 310 within the one or more flexible fluid lines 330 upon actuation).

In the embodiment shown, the method further comprises flowing the cooling fluid into an absorbing material layer 230 of the heat resistant covering 200. For instance, in the embodiment shown, upon actuation of the pump 360, the cooling fluid is circulated from the one or more flexible fluid lines 330 into the absorbing material layer 230 via perforations 336 formed in at least some of the flexible fluid lines 330. In the embodiment in which the heat resistant covering 200 comprises first and second heat resistant layers 210, 220, upon actuation of the pump 360, the cooling fluid will at least partially reach the first and second heat resistant layers 210, 220.

Moreover, the cooling fluid is further circulated, in particular under the force of gravity, into the cooling fluid source 310, for instance via perforations 311 formed therein.

In the embodiment shown, the method further comprises providing the heat resistant covering 200 into a compact configuration, monitoring a fire condition (such as a temperature in the vicinity of the heat resistant covering 200 or an atmosphere composition in the vicinity of the heat resistant covering 200), and configuring the heat resistant covering 200 into an extended configuration when the monitored fire condition corresponds to a pre-determined fire condition.

In the embodiment shown, the method further comprises monitoring a heating condition of the fire spread-limiting assembly (such as a temperature of the heat resistant covering 200 or of the cooling fluid circulating within the flexible fluid lines 330), and fluidly connecting a complementary cooling fluid tank 400 to the cooling fluid circulation assembly 300 when the monitored heating condition corresponds to a pre-determined heating condition.

In the embodiment shown, the method further comprises monitoring a fire condition (such as a temperature in the vicinity of the heat resistant covering 200 or an atmosphere composition in the vicinity of the heat resistant covering 200), and actuating the pump 360 when the monitored fire condition corresponds to a pre-determined fire condition.

In the embodiment shown, the method further comprises monitoring a heating condition of the fire spread-limiting assembly (such as a temperature of the heat resistant covering 200 or of the cooling fluid circulating within the flexible fluid lines 330), and modifying a flow rate of the pump 360 when the monitored heating condition corresponds to a pre-determined heating condition.

It is thus understood that the fire spread-limiting assembly 100 can be easily and quickly displaced and deployed so as to cover and/or to confine at least partially a fire.

Moreover, thanks to the cooling fluid circulating within the heat resistant covering 200, when the heat resistant covering 200 covers and/or confines at least partially the fire, the spreading of the fire can be limited.

It is further understood that the use of the complementary cooling fluid tank 400 allows providing additional cooling fluid to the cooling fluid circulation assembly 300, in case of a substantial vaporization of the cooling fluid circulating in the cooling fluid circulation assembly 300.

Moreover, it is understood that the heat resistant covering 200, the cooling fluid source 310 and the flexible fluid lines 330 have flexibility properties for them to be easily adapted to the shape and dimensions of the fire to be covered and/or confined at least partially. Fasteners (not represented) might further be mounted to the heat resistant covering 200 for the heat resistant covering 200 to be hung over the fire.

The fire spread-limiting assembly 100 of the disclosure is thus configured to form a mobile, extendible and flexible system configured to limit the spreading of a fire.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A fire spread-limiting assembly comprising:

a heat resistant covering; and a cooling fluid circulation assembly comprising:

a cooling fluid source integrated to the heat resistant covering, one or more flexible fluid lines being part of the heat resistant covering, and a pump fluidly connected to said one or more flexible fluid lines and to the cooling fluid source and configured to circulate the cooling fluid within said one or more flexible fluid lines upon actuation, and a fluid-cooling device fluidly connected to the cooling fluid source and configured to maintain a temperature of the cooling fluid below a pre-determined temperature limit.

2. The fire spread-limiting assembly according to claim 1, wherein the heat resistant covering comprises first and second heat resistant layers, said one or more flexible fluid lines extending at least partially between the first and second heat resistant layers and are secured to at least one of the first and second heat resistant layers.

3. The fire spread-limiting assembly according to claim 2, wherein at least one of the first and second heat resistant layers is at least partially made of fiber glass.

4. The fire spread-limiting assembly according to claim 2, wherein the cooling fluid source is at least partially delimited by one of the first and second heat resistant layers.

5. The fire spread-limiting assembly according to claim 4, wherein the cooling fluid source is at least partially formed by folding an edge of said one of the first and second heat resistant layers.

6. The fire spread-limiting assembly according to claim 2, wherein the heat resistant covering further comprises an absorbing material layer arranged between the first and second heat resistant layers, said absorbing material layer surrounding at least partially said one or more flexible fluid lines.

7. The fire spread-limiting assembly according to claim 6, wherein the heat resistant covering further comprises first and second water resistant layers, the absorbing material layer being arranged between said first and second water resistant layers.

8. The fire spread-limiting assembly according to claim 7, wherein one or more perforations are formed in said one or more flexible fluid lines for the cooling fluid to flow into the absorbing material layer.

9. The fire spread-limiting assembly according to claim 1, wherein the heat resistant covering comprises a lower end portion and the cooling fluid source is mounted to the lower end portion of the heat resistant covering.

10. The fire spread-limiting assembly according to claim 1, wherein the heat resistant covering is configurable in an extended configuration and in a compact configuration, the fire spread-limiting assembly further comprising a deployment device to configure the heat resistant covering from the compact configuration into the extended configuration and wherein the fire spread-limiting comprises a deployment controller configured to monitor a fire condition and to actuate the deployment device when the monitored fire condition corresponds to a pre-determined fire condition.

11. The fire spread-limiting assembly according to claim 1, wherein the fluid-cooling device selectively connected to the cooling fluid source when the temperature of the cooling fluid is equal to or greater than the pre-determined temperature limit.

12. The fire spread-limiting assembly according to claim 1, further comprising a complementary cooling fluid tank fluidly connected to the cooling fluid circulation assembly in a selective manner and further comprising a cooling fluid controller configured to monitor a heating condition of the fire spread-limiting assembly and to fluidly connect the complementary cooling fluid tank to the cooling fluid circulation assembly when the monitored heating condition corresponds to a pre-determined heating condition.

13. The fire spread-limiting assembly according to claim 1, further comprising a pump controller configured to monitor a fire condition and to actuate the pump of the cooling fluid circulation assembly when the monitored fire condition corresponds to a pre-determined fire condition and wherein the pump controller is further configured to monitor a heating condition of the fire spread-limiting assembly and to modify a flow rate of the pump when the monitored heating condition corresponds to a pre-determined heating condition.

14. The fire spread-limiting assembly according to claim 1, wherein the heat resistant covering comprises upper and lower edge portions and first and second lateral portions extending between the upper and lower edge portions, said one or more flexible lines comprising a main distribution line extending substantially between the upper and lower edge portions and secondary distribution lines fluidly connected to the main distribution line and extending between the first and second lateral portions and being substantially parallel to each other.

15. The fire-spread limiting assembly according to claim 1, wherein the cooling fluid circulation assembly is a substantially closed cooling fluid circuit.

16. A fire spread-limiting assembly comprising:

a heat resistant covering; and a cooling fluid circulation assembly comprising:

a cooling fluid source integrated to the heat resistant covering, one or more flexible fluid lines being part of the heat resistant covering, and a pump fluidly connected to said one or more flexible fluid lines and to the cooling fluid source and configured to circulate the cooling fluid within said one or more flexible fluid lines upon actuation, wherein the heat resistant covering is configurable in at least an extended configuration and a compact configuration, the fire spread-limiting assembly further comprising a deployment device to configure the heat resistant covering from each of the extended and compact configurations into the other one of the extended and compact configurations, wherein the fire spread-limiting assembly comprises a deployment controller configured to monitor a fire condition and to actuate the deployment device when the monitored fire condition corresponds to a pre-determined fire condition.

17. The fire-spread limiting assembly according to claim 16, wherein the heat resistant covering is vertically and horizontally larger in the extended configuration than in the compact configuration.

18. The fire-spread limiting assembly according to claim 16, the deployment device comprising extendable support members mounted to the heat resistant covering.

* * * * *